A. J. MEYER.
TIRE.
APPLICATION FILED OCT. 6, 1919.
1,342,562.
Patented June 8, 1920.
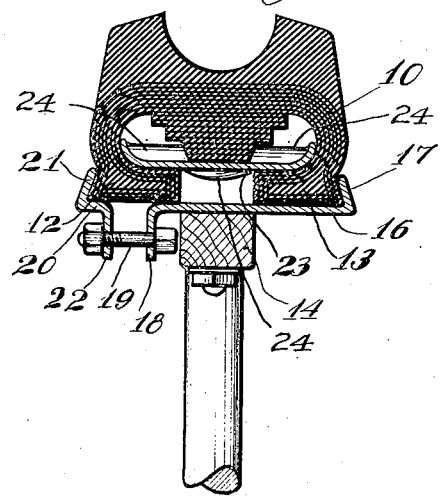
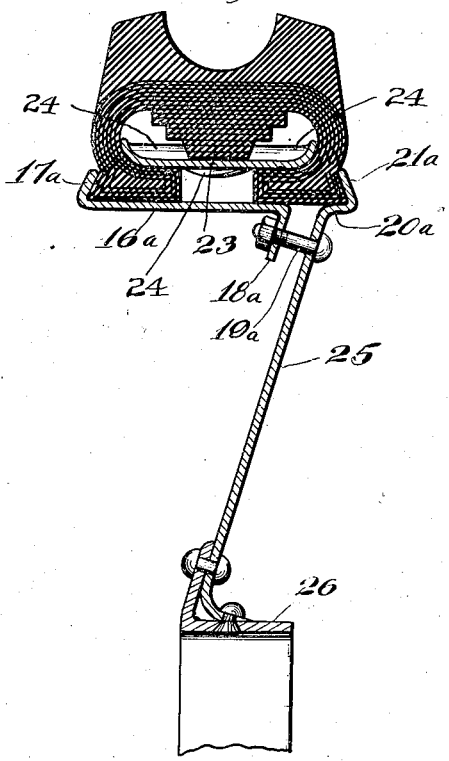
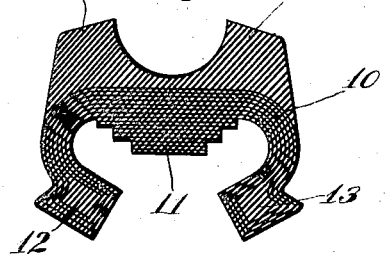
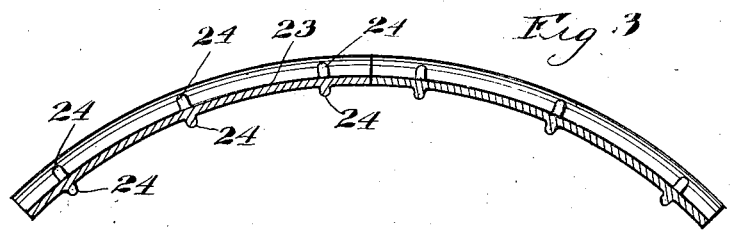
WITNESS:
Wm Casati
INVENTOR.
August J. Meyer
BY Albert C. Bee
ATTORNEY.

UNITED STATES PATENT OFFICE.

AUGUST J. MEYER, OF CHICAGO, ILLINOIS.

TIRE.

1,342,562.

Specification of Letters Patent.  Patented June 8, 1920.

Application filed October 6, 1919. Serial No. 328,752.

*To all whom it may concern:*

Be it known that I, AUGUST J. MEYER, a citizen of the United States, residing at Chicago, in the county of Cook and State of Illinois, have invented a certain new and useful Improvement in Tires, of which the following is a specification.

My invention relates to an improved form of tires for vehicles by which shocks are cushioned by the tire so that they will not be communicated to the wheels of the vehicle. My tire is intended to secure substantially the result attained by means of pneumatic tires without the use of air under pressure in the tire. This result I secure by means of novel mounting mechanism for securing the tires to the rim of a wheel and by a conformation of tires which in conjunction with the mounting devices subjects the tires to initial tension so that it is only when the tire is subjected to the stress of a load on the vehicle that the substance of the tire most effective in cushioning the shocks, is in normal and unstrained condition.

My invention will best be understood by reference to the accompanying drawings illustrating a preferred form thereof in which—

Figure 1 shows a cross sectional view of the tire and mounting devices in place on a wood wheel, Fig. 2 shows a similar view of the tire and mounting device in place on a disk wheel of the metal type.

Fig. 3 is a detail view of a portion of the mounting devices contained within the tire, and Fig. 4 is a cross sectional view of the tire in the position it assumes before being placed on the rim under the action of the mounting devices.

Similar numerals refer to similar parts throughout the several views.

As shown in Fig. 4, my improved tire consists of a body portion 10, consisting of a plurality of thicknesses of rubberized fabric which are vulcanized together in the process of forming the tire and which have secured to their inner surface a plurality of thicknesses of said fabric forming an inwardly projecting rib 11. The thicknesses of fabric forming the body portion 10 are of semicircular cross section at their edge portions and terminate in retaining flanges 12 and 13 for engagement with the mounting devices in a manner to be described. It will be observed that in the natural condition of the tire as it leaves the mold and before being mounted, that the inner surfaces of these flanges are not in the same plane or line but that they flare outwardly and that the edge surfaces of these flanges are not in parallel planes but also flare outwardly. The body portion of the tire 10 has secured to its outer surface by vulcanizing, tread ribs 15 which are opposite the annular air places formed within the edge portions of the tire when the tire is in place on the mounting devices.

As shown in Fig. 1 the rim 14 of a wood wheel has secured thereto a metal rim 16 from the edge of which an inturned and outwardly extending flange 17 projects. The other edge of the rim 16 has formed thereon an inwardly extending flange 18 through which clamping bolts 19 extend. A metal ring 20 is provided to engage the opposite side of the tire, this ring being provided with a flange 21 corresponding to the flange 17 but oppositely inclined, and this ring has also an inwardly extending flange 22 through which the clamping bolts 19 extend. The inner portion of the tire is supported and held in place by a ring 23 preferably of metal which, as shown in Fig. 3, is preferably formed in a plurality of sections. The cross section of each of these sections is preferably as indicated in Fig. 1 that is to say the edges of the section are curved to engage the curved portion of the inner surface of the tire, the central outer portion of the section is cylindrical to engage the inner portion of the rib 11, and reinforcing ribs or webs are formed on the sections at intervals, as indicated at 24 to reinforce the sections laterally.

In placing the tire on the rim 16 the flange 13 of the tire is first put in place against the flange 17, the sections of the rings 23 are then inserted in supporting position inside of the tire, the flange 12 of the tire is then forced into the position indicated in Fig. 1, and the ring 20 is then put in place over the clamping bolts 19 in engagement with the flange 12 of the tire after which the nuts of the bolts are screwed up to move the flanges 12 and 13 of the tire somewhat together. This clamping of the tire is continued until the outer portion of the edge surfaces of the fabric of the body portion are subjected to sufficient tension to about equal the normal strain to which the tire will be subjected in use as a result of which when the tire is subjected to said strain the initial strain in the tire produced by the clamping of the tire on the wheel, is neutralized and the material of the body portion of the tire at the place that is most sensitive to strain is in neutral condition and readily responsive to any inequalities of the roadbed and thus produces an extremely lively condition of the tire. This also prolongs the life of the tire since the tire for the major portion of the time is not subjected to internal strain. When through wear or otherwise the condition referred to above is disturbed, it may be regained by further clamping the flanges 12 and 13 of the tire by screwing up the nuts of the bolts 19.

In the construction shown in Fig. 2 the rim 16ª and the flange 17ª are similar to the rim 16 and flange 17 above described. The ring 20ª is formed on the outer edge of the disk 25 extending from the hub 26 of the wheel and the flange 21ª is formed on the ring 20ª' in a manner similar to the flange 21 relatively to the ring 20 shown in Fig. 1. In this construction the flanges 17ª and 21ª are brought together to hold the tire in place on the rim by the bolts 19ª in substantially the same manner as described above for the construction shown in Fig.1.

From the above it will appear that strains are produced initially in the edge portions of the tire by moving said edge portions to a position to rest upon the supporting rim of the wheel and that these strains are increased as the clamping devices are brought together to hold the tire in place. Also that, as the edge portions of the tire are subjected to strain in the manner referred to, the forces exerted upon the body portion of the tire tend to move the same toward the rim, which movement is opposed in large degree by the rib within the tire, the result of which is to subject the body portion of the tire to initial strain.

My invention includes, besides the improved structure above described, the improved method of making and mounting a tire consisting in forming a tire of resilient material having a body portion and edge portions extending inwardly from the body portion, and bending the edge portions toward the body portion to permit placing the tire on its supporting rim, thereby producing initial strains in the tire, holding the body portion of the tire against inward movement under said strains, thereby distributing said strains throughout the body portion of the tire and holding the portions of the tire in said position on a supporting rim to maintain said initial strains in the tire.

While I have shown my invention in the particular embodiment above described, it will be understood that I do not limit myself to this exact construction as I may employ equivalents known to the art at the time of the filing of this application without departing from the scope of the appended claims.

What I claim is:

1. In combination, a tire of resilient material comprising a body portion and edge portions extending inwardly from said body portion, a supporting ring within the tire, devices for engaging said edge portions to hold them toward each other, whereby the material of the tire is stretched around said ring, and a rib of resilient material projecting inwardly from the body portion of the tire and resting upon said ring.

2. In combination, a tire of resilient material having inner surfaces for engaging the edges of a ring to prevent lateral collapse of the tire, a metal ring within the tire engaging said inner surfaces, said tire having edge flanges lying wholly within said ring radially, devices within said ring for moving said flanges together to draw the side portions of the tire around the edges of said ring, and a rib projecting from said tire to said ring to prevent radial collapse of the tire.

3. A tire of resilient material having a tread and edge portions having inner surfaces for engaging a metal ring to prevent lateral collapse of the tire, said edge portions having flanges wholly within said inner surfaces radially for engaging lateral clamping devices for drawing said edge portions around said ring, and a resilient rib projecting inwardly from said tread for engagement with said ring to prevent radial collapse of said tire.

4. In combination, a tire of resilient material comprising a body portion and edge portions extending inwardly from said body portion, a supporting ring within the tire, and devices of smaller diameter than said ring for engaging said edge portions to draw said edge portions toward each other, whereby the material of the tire is stretched around said ring.

5. In combination, a tire of resilient material comprising a body portion and edge portions extending inwardly from said body portion, a supporting ring within the tire, and devices of smaller diameter than said ring for engaging said edge portions to draw them toward each other, whereby the material of the tire is stretched around said ring, said ring having rounded edges for engaging the tire and made in sections to facilitate inserting said ring in the tire.

6. In combination, a tire of resilient material comprising a body portion and edge portions extending inwardly from said body portion, a supporting ring within the tire, and devices of smaller diameter than said ring for engaging said edge portions to draw them toward each other, whereby the material of the tire is stretched around said ring, said edge portions having flanges for engaging said devices.

7. In combination, a tire of resilient material comprising a body portion and edge portions extending inwardly from said body portion, a supporting ring within the tire, and devices of smaller diameter than said ring for engaging said edge portions to draw them toward each other, whereby the material of the tire is stretched around said ring, said edge portions having flanges for engaging said devices, said tire flanges being inclined outwardly when unrestrained, whereby moving said flanges into clamping relation stretches the edge portions of said tire.

8. In combination, a tire of resilient material comprising a body portion and edge portions extending inwardly from said body portion, a supporting ring within the tire, and clamping devices of smaller diameter than said ring for engaging said edge portions to move them toward each other, whereby the material of the tire is stretched around said ring, said clamping devices comprising a wheel rim and a ring having outwardly extending and inwardly inclined flanges and bolts for drawing said rim and ring together.

9. In combination, a tire of resilient material comprising a body portion and edge portions extending inwardly from said body portion, a supporting ring within the tire, and clamping devices of smaller diameter than said ring for engaging said edge portions to move them toward each other, whereby the material of the tire is stretched around said ring, said clamping devices comprising a wheel rim and a ring having outwardly extending and inwardly inclined flanges and bolts for drawing said rim and ring together, said tire flanges being inclined outwardly when unrestrained, whereby moving said flanges into holding relation stretches the edge portions of said tire.

10. In combination, a tire having a tubular body portion of resilient material provided with inner edge flanges, restraining means within the tire for preventing lateral collapse of the tire, and clamping means of less external diameter than the diameter of said restraining means for engaging said flanges to move them toward each other.

11. In combination, a tubular tire of resilient material having separated inner edge flanges, a restraining ring in said tire, and clamping rings of smaller external diameter than the diameter of said restraining ring engaging said flanges.

12. In combination, a tubular tire of resilient material having separated inner edge flanges, a retaining ring in said tire, and clamping devices engaging said flanges, said clamping devices comprising a wheel rim and a clamping ring each of smaller external diameter than the diameter of said retaining ring and bolts for drawing said rim and clamping ring together.

13. In combination, a tire of resilient material having inner surfaces for engaging the edges of a ring to prevent lateral collapse of the tire, a metal ring within the tire engaging said inner surfaces, said tire having edge flanges of smaller external diameter than the diameter of said ring and devices of smaller external diameter than the diameter of said ring for moving said flanges together to draw the side portions of the tire around the edges of said ring.

14. A tire of resilient material having a tread and edge portions having inner surfaces for engaging a metal ring to prevent lateral collapse of the tire, said edge portions having flanges of smaller external diameter than the diameter of said inner surfaces for engaging lateral clamping devices of substantially the diameter of said flanges to draw said edge portions around said ring.

In witness whereof I hereunto subscribe my name this 1st day of October, A. D. 1919.

AUGUST J. MEYER.